Sept. 2, 1952     M. STUBNITZ     2,609,036
AUTOMOBILE SEAT SPRING
Filed June 2, 1950     6 Sheets-Sheet 1
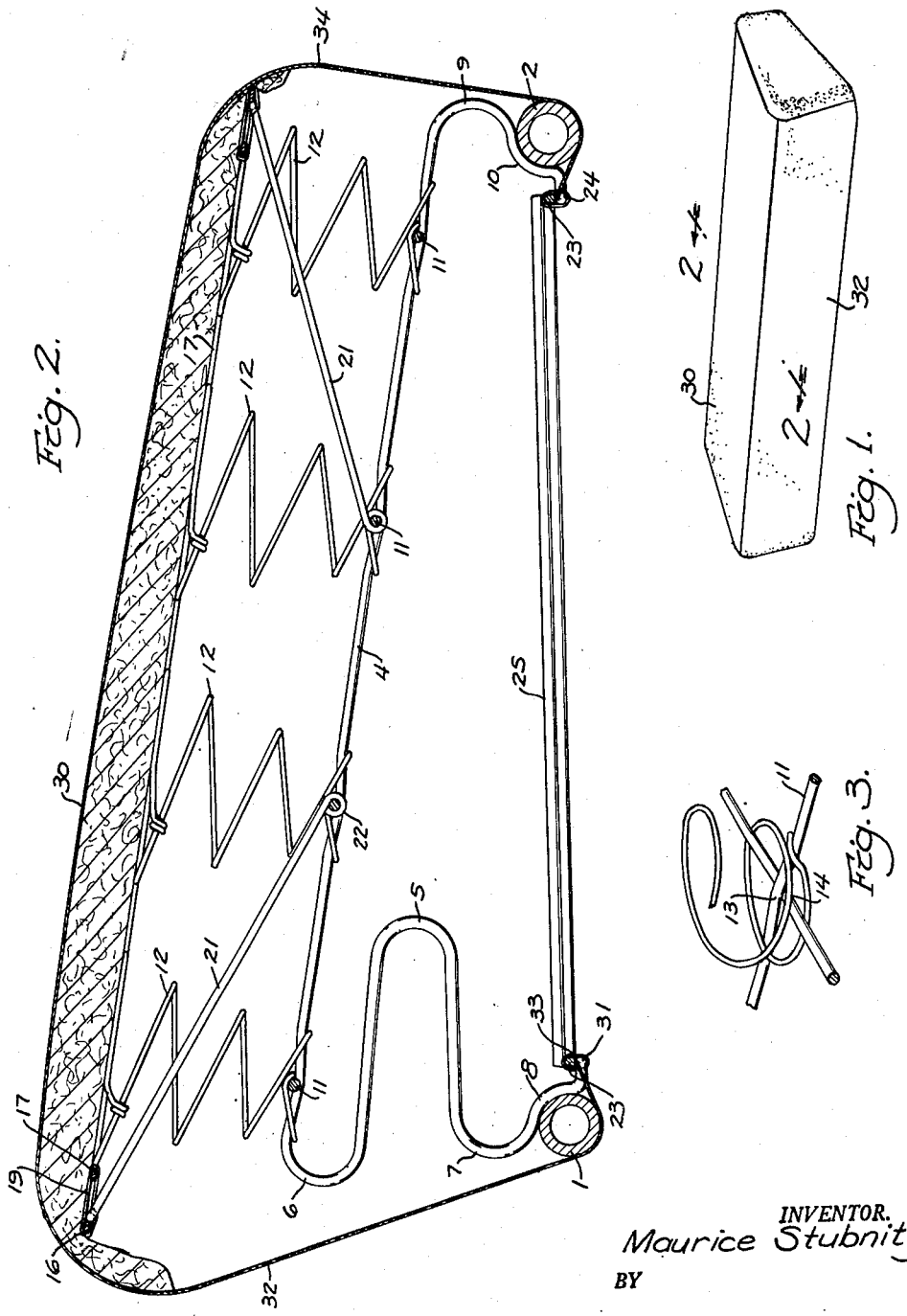
INVENTOR.
Maurice Stubnitz
BY
Barnes, Kisselle, Laughlin, & Raisch
Attorneys.

INVENTOR.
Maurice Stubnitz
BY
Barnes, Kisselle, Laughlin & Raisch
Attorneys.

Sept. 2, 1952 M. STUBNITZ 2,609,036
AUTOMOBILE SEAT SPRING
Filed June 2, 1950 6 Sheets-Sheet 3

INVENTOR.
Maurice Stubnitz
BY
Barnes, Kisselle, Laughlin & Raisch
Attorneys.

Sept. 2, 1952 M. STUBNITZ 2,609,036
AUTOMOBILE SEAT SPRING
Filed June 2, 1950 6 Sheets-Sheet 4
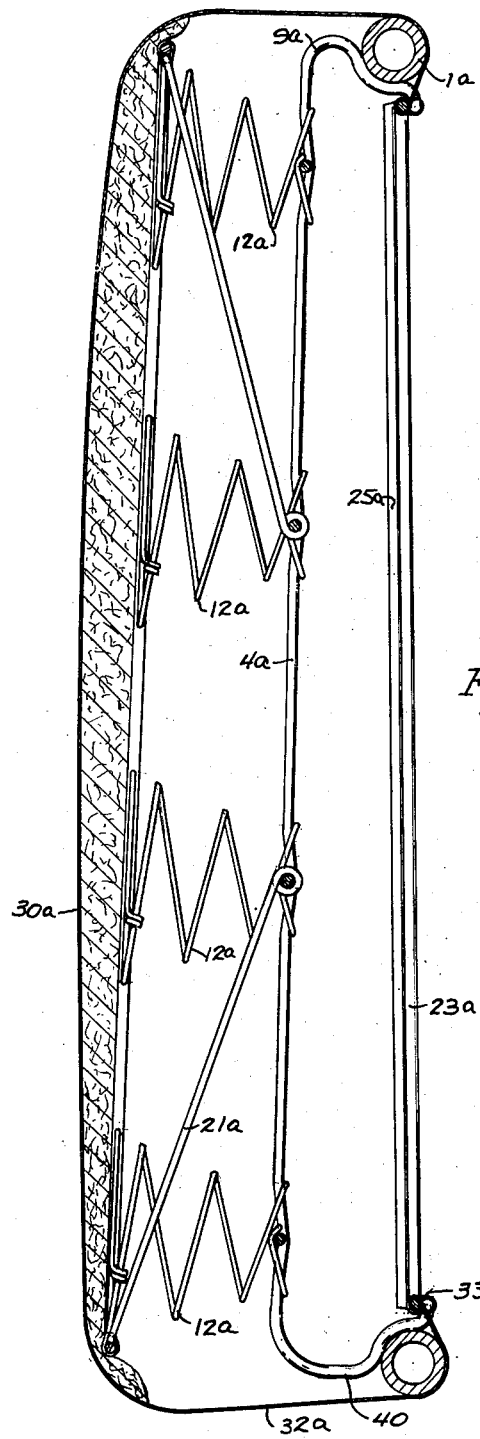
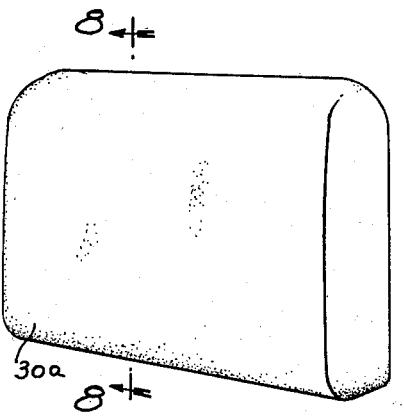
Fig. 7
Fig. 8.
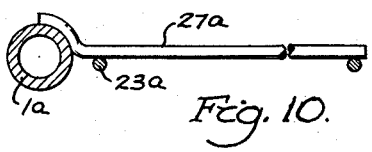
Fig. 10.
INVENTOR.
Maurice Stubnitz
BY
Barnes, Kisselle, Laughlin & Raisch
Attorneys.

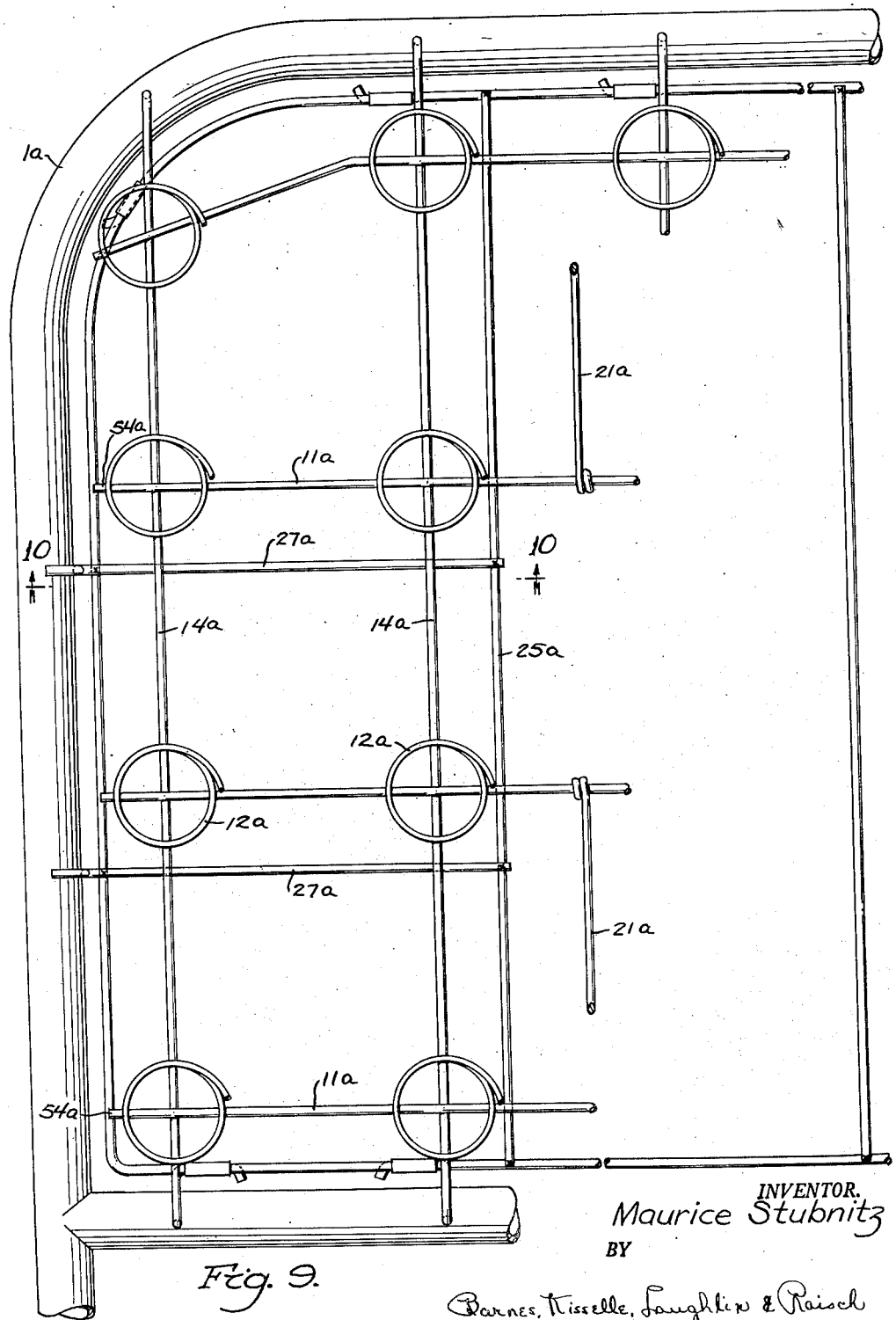

Patented Sept. 2, 1952

2,609,036

UNITED STATES PATENT OFFICE 2,609,036

AUTOMOBILE SEAT SPRING

Maurice Stubnitz, Adrian, Mich., assignor to Stubnitz-Greene Spring Corporation, Adrian, Mich., a corporation of Michigan Application June 2, 1950, Serial No. 165,734

4 Claims. (Cl. 155—180)

This invention relates to seat springs and it has for its object a seat spring which can be applied to the body by a simple application of the upholstery. It does not have to be fastened in the seat frame by means of clips, lugs or wiring.

Another feature of the invention is that it provides a seat cushion spring which is competitive with the zig-zag or wavy wire spring which is now being used in many automobiles because the wavy wire seat spring is cheaper than conventional cushion springs and saves in transportation costs. My improved seat cushion uses coiled load supporting springs of length considerably shorter than the normal coiled load supporting springs, in combination with spring beams or stringers that extend from front to rear of the seat. This constitutes a saving in the coil load supporting springs. The combination of the flexible stringers and the coil springs also affords more comfort for the rider because the coil springs allow the seat to conform to the shape of the rider's body and the spring load supporting beams give an easy flexing action when the load is subjected to abrupt movement by reason of a rough road.

Referring to the drawings:

Fig. 1 is a small perspective view of the upholstered seat.

Fig. 2 is a cross section on the line 2—2 of Fig. 1.

Fig. 3 shows how the coil springs are assembled on the intersections of the stringers.

Fig. 7 is a small perspective of the seat back cushion.

Fig. 8 is a section on the line 8—8 of Fig. 7.

Fig. 9 is a fragmentary section through the seat back spring showing the rear parts in a plan view.

Fig. 10 is a section on the line 10—10 of Fig. 9.

Figure 4:
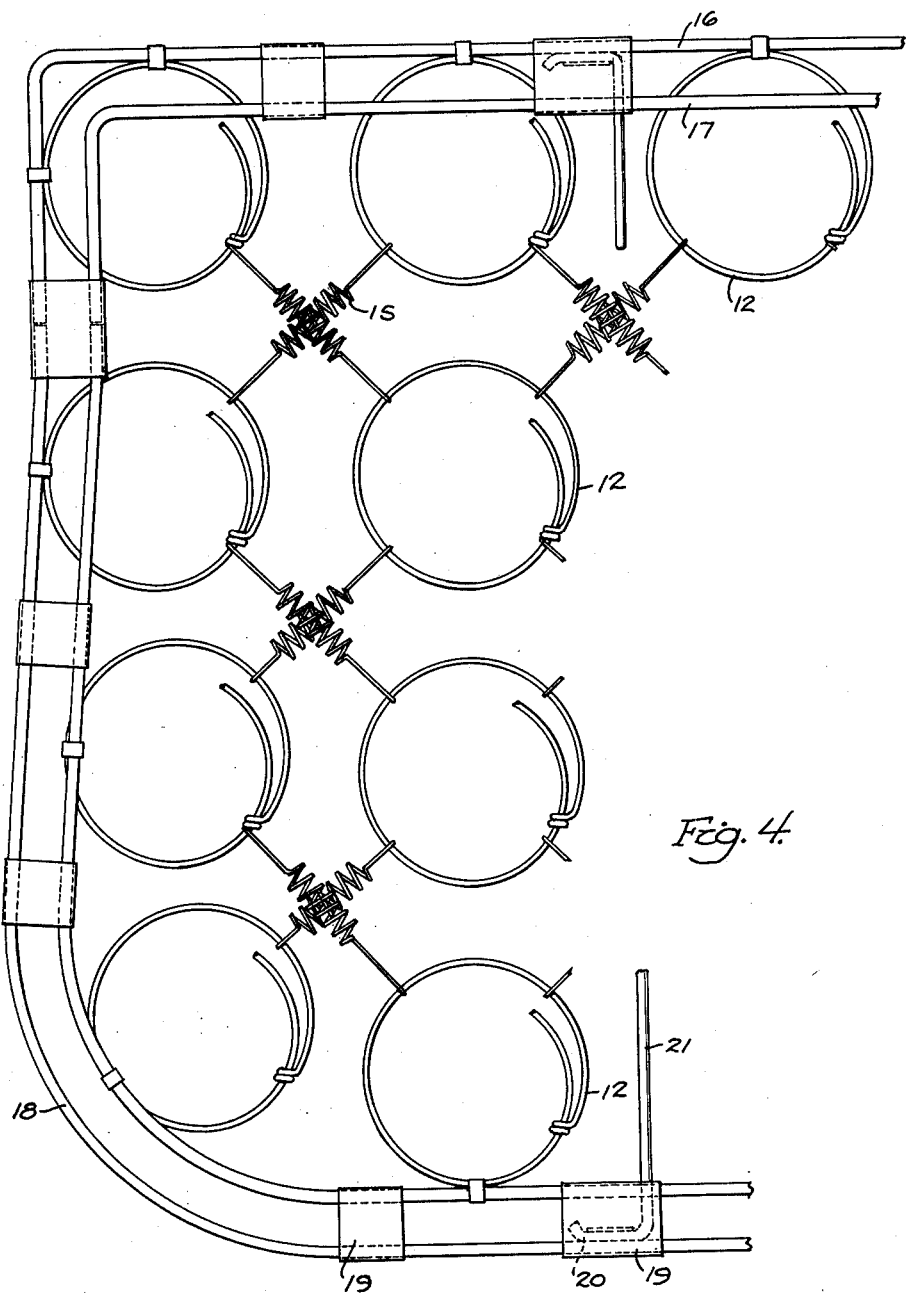
Fig. 4 is a fragmentary top plan view of the seat spring.
Figure 5:
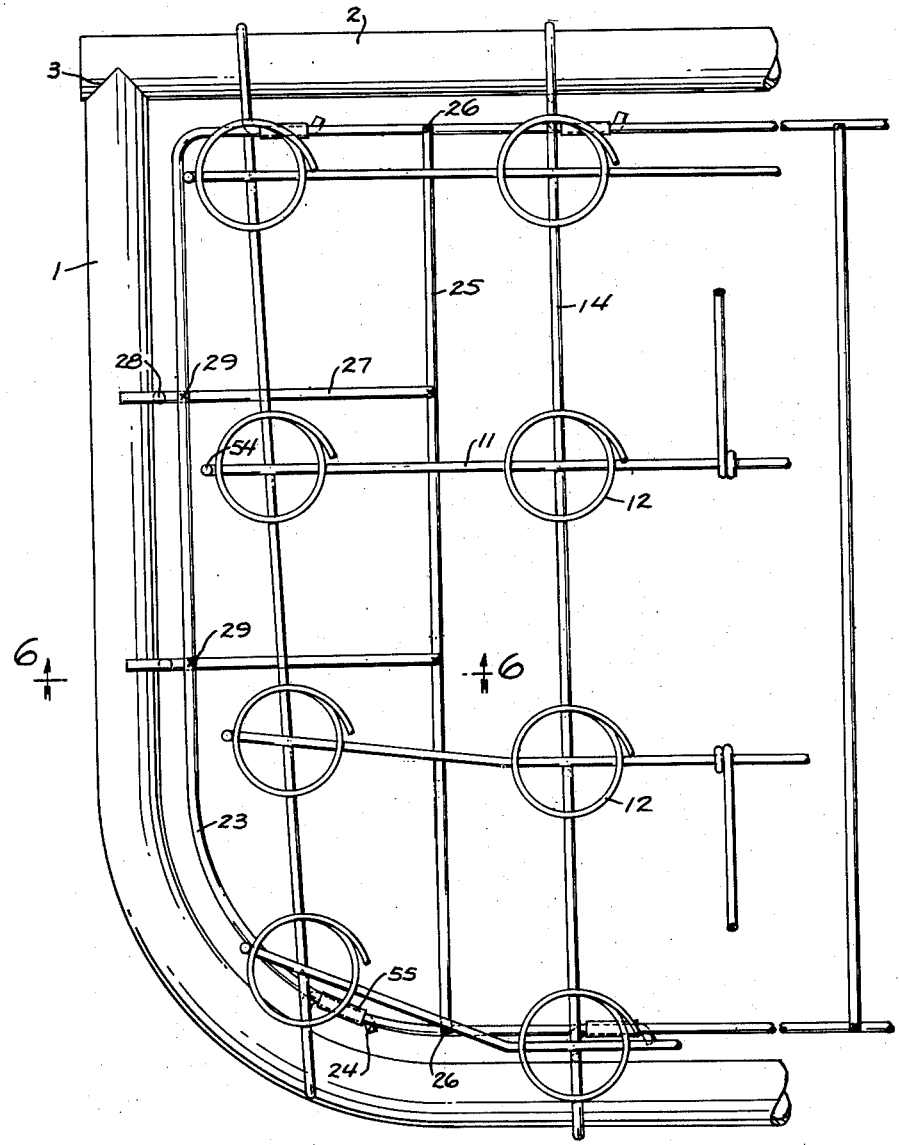
Fig. 5 is a plan view of the wire base of the seat cushion, being a horizontal cross section through the spring cushion.

Referring to Fig. 5, the seat frame is constructed of a tube 1 that is bent to form the front and two sides of the supporting frame. The tube 2 forms the back of the supporting frame and has its ends welded to the tube 1 with a mitered joint 3.

The base of the seat cushion is formed by a wire network or a wire mat of large interstices and which moves up and down with the load. The spring beams or stringers 4 support this mat for this movement. They are at the front looped back and forth to form the loops 5, 6, and 7. First the stringer is bent back to form the U loop 6 and then is returned and bent to form the U loop 5, and then is bent back to form the shallow loop 7 that has therein a slight or shallow bend 8 that forms the seating bend. This is arranged to sit on the tube 1 as shown in Fig. 2.

At the rear the flexible stringer 4 is bent in a shallow loop 9 and then has a slight return bend that forms a seating bend 10 adapted to rest on or inside the rear tube 2 of the tubular frame.

Cross stringers 11 are laid across the flexible stringers 4 and then the load supporting springs 12 are screwed in place at the intersection of the stringers as shown in Fig. 3. It will be noted that the stringers have slight bends 13 and 14 at the place where they are intended to intersect and receive the load supporting springs. This screw type of assembly is described and claimed in the application of Harlan L. Davis, Serial No. 139,214, filed January 18, 1950, which has since become abandoned. The cross stringers 11 have unattached and floating ends 54 so the whole wire mat may rise and fall as a unit, but still can bend in itself by reason of the flexible wire stringers. The up and down movement of the mat as a unit is resisted by the triple loop construction at the front of the flexible stringers 4 and the single loop 9 at the rear.

The coil load supporting springs 12 also add some cushioning action and they are individually depressed when the rider is in place to conform to his body contour. They can be individually depressed because at the top they are connected by flexible coil spring ties 15 which are very easily stretched so that one individual spring may pull away from the surrounding group. The top of the spring is provided with a border wire frame made up of two flat wires 16 and 17 bent into an approximate rectangular frame but deviating from a strict rectangle at the side and front corners. This rim is straight at the back and bends slightly at the sides and curves around the corners as at 18. The rim wires are connected by sheet metal ties 19 that are formed by strip metal that is turned back upon itself to tie the two flat rim wires 16 and 17 together as shown in Fig. 2. These sheet metal strips also tie in with the hooked over ends 20 of the oblique bracing wires 21 that are located both at the front and at the rear of the spring, and which have their lower ends 22 doubled over the cross stringers 11.

Figure 6:
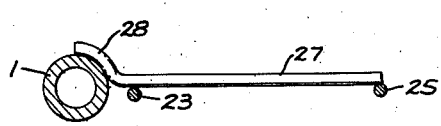
Fig. 6 is a section taken on the line 6—6 of Fig. 5.
Figure 11:
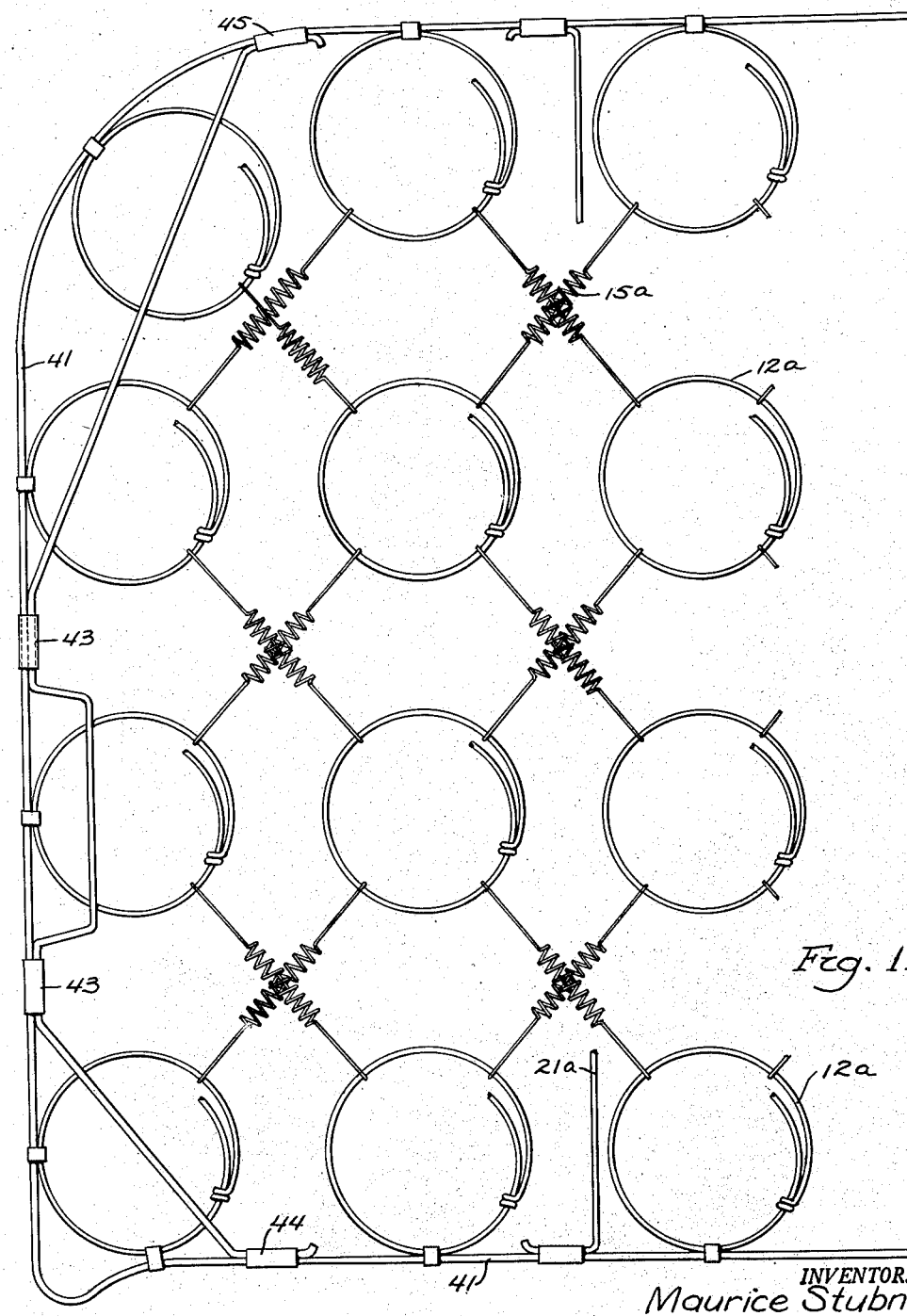
Fig. 11 is a fragmentary plan view of the seat back spring.

At the bottom of the spring seat is a wire frame 23 which is clipped at 55 to the hooked over ends 31 of the flexible stringers 4. This bottom wire frame is reinforced at the ends by means of the rigid wire beam 25 which has its ends welded to the bottom rim wire 23 at the points 26. Bridging wires 27 extend from this wire beam 25 to the side portions of the wire bottom frame and are welded thereto at the intersections 29. These bridging members have extended ends that are bent up to form seating portions 28 that fit over the tube 1 at the sides of the tubular frame as shown in Fig. 6.

The spring cushion is seated on the frame as shown in Fig. 2. Thereupon the cover or trimming material 30 is stretched over the upholstery material, which may be any suitable stuffing material such as cotton, hair, or foam rubber. The front apron 32 may then be stretched down under the tube 1 and under the bottom frame 23 and clipped thereto by hog rings 33. The back apron 34 of the trim material may then be stretched down under the tube 2 and under the wire bottom frame 23 and clipped thereto by clips 24. The same can be done at the ends of the cushion.

It will thus be seen that all that is required to hold the cushion in place is the upholstery material and the hog rings that clip it to the bottom wire frame. The cushion may be easily removed by simply unfastening the hog rings and removing the upholstery, but this will not ordinarily be necessary.

Figs. 7–11 inclusive show a similar work out and design for a seat back spring, except here the spring stringers 4a have at the lower side of the cushion a shallow single U loop 40 in place of the triple loop 5, 6, and 7 in the seat cushion spring of Figs. 1–6 inclusive. The outer rim frame is different, being a single wire rim reinforced by the sort of "W" wire brace clipped twice at the center of the "W" by clips 43 to the side portion of the wire rim 41 and at the bottom fastened by clip 44 to the wire rim and at the top fastened by clip 45 to the wire rim.

Most of the other parts in the seat back spring are identical with seat bottom parts and are correspondingly numbered with an "a" added to the corresponding number.

There is a further advantage in this construction over conventional springs as follows:

Most conventional springs make use of a relatively heavy and expensive bottom trim frame to support the overall load as well as a means for fastening upholstery cover. In this invention the tubular cushion support takes the place of the heavy bottom trim frame: load being transmitted from the stringers to the tube at return bends 8 and 9. Considerable saving in cost is effected by this additional use of the tubular cushion support.

What I claim is:

1. A spring seat cushion comprising a spring assembly having in combination a wire base frame comprising a wire rim extending around the four sides, flexible wire beams or stringers extending from the front to the back of the seat cushion and having loops at the front and the rear and shallow return bends which are arranged to fit within and removably rest on a tubular supporting frame which is secured to the automobile body, the ends of the flexible wire beams being secured to the wire base rim, cross stringers laid over the flexible forwardly and rearwardly extending stringers, coiled load-supporting springs fastened at the intersections to the stringers, a top rim fastened to the tops of the coiled load-supporting springs and flexible ties connecting together the tops of the coiled load-supporting springs, bridging wires secured to the side portions of the base rim and having bent up seat supporting portions extending beyond the rim wire at the sides of the bottom frame and fitting over the tubular side portions of the tubular frame, the said spring seat fitting within the tubular supporting frame with the return bend seating portions of the forwardly and rearwardly extending flexible stringers engaging over the front and rear tube portions of the supporting frame and the bent up portions of the bridging wires engaging the side tube portions of the tubular frame, and the seat spring assembly secured in place by a trimming material stretched thereover and over and under the tubular frame members and then clipped to the wire bottom rim member.

2. The combination claimed in claim 1 in which rigid beam wires extend from front to rear of the base rim and support the inner ends of the bridging wires.

3. The combination claimed in claim 1 in which each front loop of the flexible wire beams is a triple U loop.

4. A spring seat cushion comprising a spring assembly having in combination a wire base frame comprising a wire rim extending around the four sides, flexible wire beams or stringers extending from the front to the back of the seat cushion and having loops at the front and the rear and shallow return bends which are arranged to fit within and removably rest on a tubular supporting frame which is secured to the automobile body, the ends of the flexible wire beams being secured to the wire base rim, cross stringers laid over the flexible forwardly and rearwardly extending stringers, coiled load-supporting springs fastened at the intersections to the stringers, a top rim fastened to the tops of the coiled load-supporting springs and flexible ties connecting together the tops of the coiled load supporting springs, the said spring seat fitting within the tubular supporting frame with the return bend seating portions of the forwardly and rearwardly extending flexible stringers engaging over the front and rear tube portions of the supporting frame, and the seat spring assembly secured in place by a trimming material stretched thereover and over and under the tubular frame members and then clipped to the wire bottom rim member.

MAURICE STUBNITZ.

REFERENCES CITED

The following references are of record in the file of this patent:

UNITED STATES PATENTS

| Number | Name | Date |
| --- | --- | --- |
| 977,566 | Sorey | Dec. 6, 1910 |
| 2,061,725 | Wesley | Nov. 24, 1936 |
| 2,364,948 | Clark | Dec. 12, 1944 |
| 2,469,216 | Spunt et al. | May 3, 1949 |